United States Patent [19]
Beavers et al.

[11] Patent Number: 5,865,048
[45] Date of Patent: Feb. 2, 1999

| [54] | VEHICLE IMMOBILIZER WITH INDEXING INNER ARM ASSEMBLY |
|---|---|
| [75] | Inventors: Allan E. Beavers; Robert A. Fulcher, both of Grand Junction, Colo. |
| [73] | Assignee: Beavers et al. |
| [21] | Appl. No.: 880,705 |
| [22] | Filed: Jun. 23, 1997 |

Related U.S. Application Data

[63] Continuation-in-part of Ser. No. 27,276, Aug. 18, 1994, Pat. No. Des. 385,525.

[51] Int. Cl.$^6$ ..................................................... E05B 73/00
[52] U.S. Cl. ................................... 70/18; 70/226; 188/32
[58] Field of Search ................................... 70/14, 18, 19, 70/225, 226; 188/32

[56]        References Cited

U.S. PATENT DOCUMENTS

| Re. 24,712 | 10/1959 | Marugg ....................................... 70/225 |
| 2,960,857 | 11/1960 | Winter ..................................... 70/225 X |
| 3,828,590 | 8/1974 | Thiebault ............................... 70/225 X |
| 3,868,837 | 3/1975 | Quimby .................................... 70/18 X |
| 4,164,131 | 8/1979 | Desmond et al. ....................... 70/19 X |
| 4,441,586 | 4/1984 | Bernier .................................... 70/19 X |
| 4,649,724 | 3/1987 | Raine ........................................ 70/226 |
| 4,723,426 | 2/1988 | Beaudoin ............................... 70/18 X |
| 4,819,462 | 4/1989 | Apsell ..................................... 70/226 X |
| 4,833,442 | 5/1989 | Von Heck ............................. 70/226 X |
| 5,134,868 | 8/1992 | Bethards ..................................... 70/18 |

FOREIGN PATENT DOCUMENTS

| 992345 | 7/1976 | Canada ..................................... 70/19 |
| 2520683 | 8/1983 | France ..................................... 70/226 |
| 76348 | 5/1983 | Japan ...................................... 70/225 |

*Primary Examiner*—Suzanne Dino Barrett
*Attorney, Agent, or Firm*—Sheridan Ross P.C.

[57]    ABSTRACT

A vehicle immobilizing device adapted for removable interconnection to a vehicle wheel assembly for temporarily immobilizing the vehicle. The vehicle immobilizing device utilizes an outer arm, an inner arm, an engagement dome, and a securing mechanism which in combination provides engagement to the vehicle wheel assembly in at least four distinct locations to prevent unauthorized removal.

20 Claims, 7 Drawing Sheets

VEHICLE IMMOBILIZER WITH INDEXING INNER ARM ASSEMBLY

This is a continuation-in-part application of U.S. patent application Ser. No. 29/027,276 having a filing date of Aug. 18, 1994, now U.S. Pat. No. Des. 385,525.

FIELD OF THE INVENTION

The present invention relates to a device and method for temporarily immobilizing wheeled vehicles to inhibit theft or the unauthorized movement of those vehicles.

BACKGROUND OF THE INVENTION

The use of vehicle immobilizers to prevent the unauthorized movement of automobiles and other wheeled vehicles has been known for some time. The original rudimentary devices were designed for the same basic purpose as those today. That is, to prevent theft and to assure the payment of parking fines prior to movement of the vehicle. Thus, the use of vehicle immobilizers has become widespread with law enforcement, parking attendants, city governments and individuals concerned with the theft of their vehicles.

Unfortunately, the vehicle immobilizing devices currently known in the art are difficult to install, can damage the vehicle, are prone to being removed by unauthorized personnel and are not versatile for use on a variety of vehicles and wheel assemblies.

One problem associated with many vehicle immobilizer designs is the ease upon which they can be removed by irate vehicle owners and thieves. This is a result of inadequate points of engagement or contact between the immobilizing device and the vehicle wheel assembly. As used herein, the term "vehicle wheel assembly" is defined as a vehicle wheel and hubcap, an interconnected tire, brake mechanism and in some vehicle designs tie rods which are used for support and/or steering purposes. The brake mechanism may include a drum or disk brake with or without a brake backing plate. Thus, without adequate points of contact, the vehicle immobilizer can be pried and pulled off. This often occurs in conjunction with letting the air out of the tire until the device can be removed from the wheel assembly. For example, U.S. Pat. No. 24,712 to Marugg and U.S. Pat. No. 2,960,857 to Winter both utilize only 3 points of engagement on the vehicle wheel assembly. These points of contact include the outer hubcap, the outer wheel surface and the inner wheel surface.

Another problem associated with many types of vehicle immobilizers is the difficulty associated with installation and removal. This is due to their generally heavy weight and inner and outer arm assemblies which must be precisely positioned on the inner and outer wheel rims with very limited space. Thus, proper installation is time consuming and often performed improperly by unskilled installers, resulting in damage to the vehicle wheel assembly or unauthorized removal.

Yet another problem associated with many types of vehicle immobilizers is the permanent damage caused to the vehicle inner wheel, outer wheel, wheel rims, hubcaps and/or braking mechanisms. The damage to the hubcap and or outer wheel rim is the result of significant force and abrasion from a rigid metallic plate or arm assembly which is pressed against the hubcap or outer wheel. Any prying or movement of the dome will permanently scratch and/or dent the hubcap or outer wheel causing considerably damage.

The outer and inner wheel rims may also be damaged with many types of vehicle immobilizing devices as a result of the rigid rim jaws which are engaged to the inner or outer rim. Any prying of the vehicle immobilizer may result in the rims becoming bent or disfigured resulting in expensive repair or replacement costs.

Finally, an additional problem associated with many vehicle immobilizing devices is a lack of versatility for use on a variety of models of wheel assemblies and automobiles. Thus, even for a certain size or model of vehicle many vehicle immobilizers cannot be used interchangeably on both the right side and left side of a vehicle. Thus, installers must have numerous models in stock for a variety of vehicles rather than utilize a versatile, universal model capable of use on a variety of vehicles and wheel assemblies.

SUMMARY OF THE INVENTION

It is therefore an object of the present invention to provide a lightweight, versatile vehicle immobilizing device which is adapted for attachment to a wheeled vehicle to inhibit theft and the unauthorized removal of the vehicle. The device preferably engages the wheel assembly of a vehicle at a minimum of four distinct locations to provide sufficient securement.

Accordingly, in one aspect of the present invention a vehicle immobilizing device is provided for removable attachment to a vehicle wheel assembly. The wheel assembly generally comprises a wheel, an interior and exterior wheel surface, a tire interconnected thereto, a hubcap, a braking mechanism, and/or a tie-rod assembly.

The immobilizing device generally comprises an outer arm and an inner arm interconnected to a base assembly which encloses a securement means for securing the immobilizing device to the vehicle wheel assembly. More specifically, the outer arm is interconnected on a first end to the base assembly and on a second end to an engagement dome which is positioned for engagement to the exterior wheel surface. The outer arm additionally has an interconnected tire stop to engage an outer surface of the vehicle tire. The inner arm has a first end hingedly interconnected to the base a second end operatively shaped to fit between the brake mechanism and the wheel assembly to frictionally engage an inner portion of the wheel.

Additionally, a stopping member is interconnected proximate to the second end of the inner arm which engages either a portion of the brake mechanism, i.e., a brake drum or brake backing plate, or the vehicle tie rods. As the stopping member engages the brake mechanism or tie rods, the second end of the inner arm is driven inward to frictionally engage the inner wheel rim. Thus, the vehicle immobilizer is in contact with the vehicle wheel assembly at four distinct locations which substantially prevents the device from being removed without a custom wrench used by the installer.

The securement assembly is interconnected to the base and preferably comprises a threaded bolt which is received by a threaded aperture. One end of the threaded bolt is in contact with a first end of the inner arm while an opposite end of the bolt is machined to receive a securement tool such as custom fitted wrench. When the bolt is turned for securing the immobilizing device to a vehicle wheel assembly, the first end of the inner arm is forced outwardly from the base in a direction opposite the outer arm. This movement drives the engagement dome into the outer wheel as the outer arm pivots on the tire stop which is in contact with an outer surface of the vehicle tire. Simultaneously, the second end of the inner arm is forced between the brake mechanism and inner wheel, while the stopping member engages the brake mechanism or tie rod.

In a preferred embodiment of the present invention the inner arm has a curved shape to fit around an inflated tire and the second end of the inner arm has an arcuate cross-sectional shape. This geometric configuration permits frictional engagement to the inner surface of the wheel and thus increased difficulty in unauthorized removal. Additionally, the arcuate cross-sectional shape of the second end of the inner arm helps guide or "index" the second end of the inner arm between the brake mechanism and inner wheel rim during installation.

In another embodiment of the present invention the engagement dome is preferably concentric in shape with a recessed interior portion which is sized to accept a portion of an outer wheel assembly while a perimeter edge of the engagement dome is in contact with an outer perimeter of the wheel or hubcap. This configuration allows the engagement dome to fit securely to the perimeter of the outer wheel surface or hubcap without causing damage to the vehicle wheel. Additionally, a non-metallic material such as rubber or plastic may be interconnected to the perimeter of the engagement dome to further inhibit scratching or other damage during the installation and removal of the vehicle immobilizer device.

DETAILED DESCRIPTION OF THE PREFERRED EMBODIMENT

In one aspect of the present invention, a vehicle immobilizer 2 is provided which is adapted for use in combination with a vehicle wheel assembly 72. For reference purposes herein, the vehicle wheel assembly 72 comprises a wheel having an inner and outer surface, a hubcap, a brake mechanism, a tire interconnected to said wheel, and a tie rod assembly. The tie rod assembly and hubcap may or may not be engaged by the vehicle immobilizer depending on the vehicle model.

The vehicle immobilizer 2 generally comprises an outer arm 4 having a first end 16, a second end 18, and an adjustment apparatus for modifying the total length of the outer arm 4. A tire stop 14 is interconnected to the outer arm 4 and extends inwardly in the direction of the inner arm 6 for frictional engagement to an outer surface of the vehicle tire 54. A wheel engagement dome 10 having a leading perimeter edge 12 is interconnected on the second end 18 of the outer arm 4 for engaging the vehicle wheel assembly 72. Preferably, the vehicle immobilizer inner arm 6, outer arm 4 and base 8 are generally constructed of a heavy duty steel which is resistant to bending, cutting or deformation to inhibit removal by non-authorized personnel. However, as appreciated by one skilled in the art, many other materials having the same physical characteristics described above could be used.

An inner arm 6 is provided which has a first end 24 and a second end 26. The second end 26 is operatively shaped to fit between the brake mechanism 70 and an inner surface 48 of the wheel assembly 72, wherein at least a portion of the second end 26 of the inner arm 6 frictionally engages an inner surface 48 of the wheel. The inner arm 6 further includes a stopping member 66 interconnected proximate to the second end 26 of the inner arm and which extends outwardly to engage a brake mechanism 70 and/or vehicle tie rods 58 during use.

The vehicle immobilizer 2 additionally includes a base 8 which is rigidly interconnected to the first end 16 of the outer arm 4 and pivotally interconnected to the first end 24 of the inner arm 6, wherein the inner arm 6 can pivot in a direction both inwardly and outwardly from the outer arm 4.

Furthermore, the vehicle immobilizer 2 includes a securing mechanism which is interconnected to the base 8 to provide a force to the first end 24 of the inner arm 6. This force drives the first end 24 of the inner arm 6 outwardly from the base 8, wherein the engagement dome leading perimeter edge 12 frictionally engages the wheel assembly 72, the tire stop 14 engages the vehicle tire, the stopping member 66 engages the brake mechanism 70, and the second end 26 of the inner arm 6 engages the wheel inner surface 48.

Figure 1:
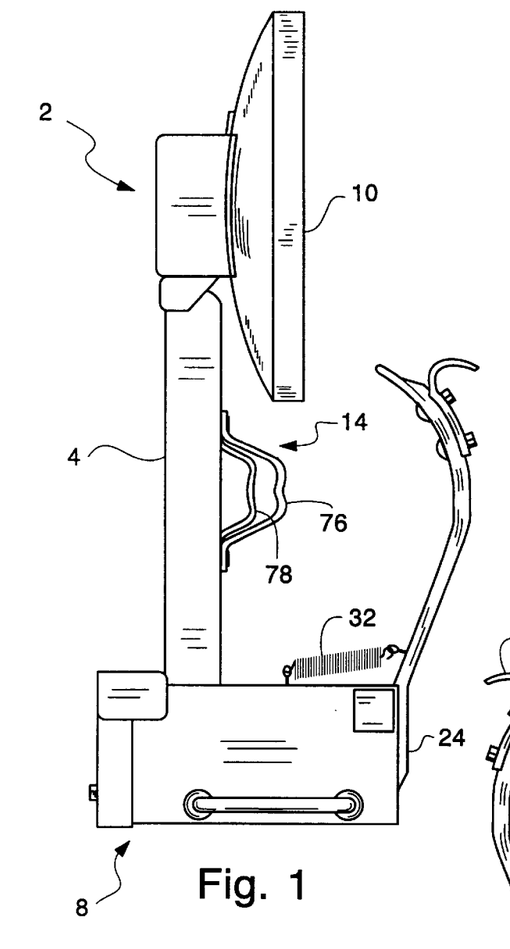
FIG. 1 is a plan top view of a vehicle immobilizer device.
Figure 2:
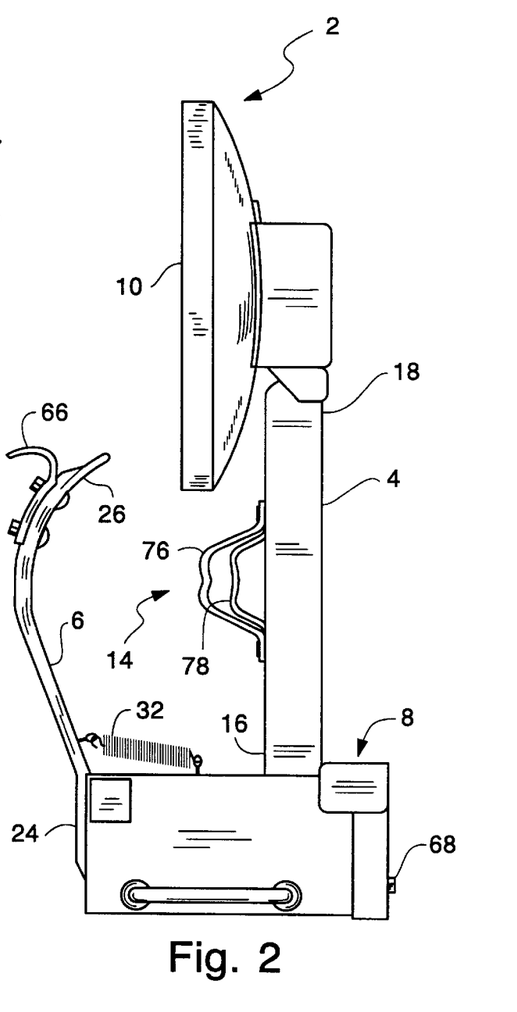
FIG. 2 is a bottom plan view of the vehicle immobilizer device illustrated in FIG. 1.

Referring now to the drawings, FIG. 1 is a top plan view of the vehicle immobilizer 2, while FIG. 2 is a bottom plan view of the vehicle immobilizer 2. As identified in both FIG. 1 and FIG. 2, the vehicle immobilizer 2 is generally comprised of an inner arm 6 and an outer arm 4 interconnected on a first end to a base 8. The outer arm second end 18 is interconnected to a wheel engagement dome 10 which during use is secured against the wheel assembly exterior surface 50 and/or a vehicle hubcap 52. Preferably, the outer arm inner surface 20 has a tire stop 14 extending inwardly towards the inner arm 6 for the purpose of engaging the vehicle tire 54 and to act as a pivot point for the outer arm 4 as the vehicle immobilizer 2 is secured to the vehicle wheel assembly 72.

In a preferred embodiment the tire stop 14 comprises an outer member 76 and an inner member 78, wherein the tire stop 14 can be adjusted for different tire sizes. Thus, if a vehicle wheel assembly has a very wide tire, the outer member 76 can be temporarily removed so the inner member 78 engages the tire 54. Preferably, the outer member 76 is removably interconnected to the outer arm inner surface 20 by a pin or peg welded to the outer tire stop. The pins are received by apertures positioned on the outer arm inner surface 20 and thus allow the outer tire stop 76 to be quickly removed to accommodate larger tires. When the outer tire stop 76 is engaged to the tire during installation, it is virtually impossible to remove the outer tire stop 76 due to the force exerted by the tire which retains the pins in the apertures. Furthermore, it is possible to attach three or more removable tire stops 14 to the outer arm 4 to provide an even greater amount of versatility for different sizes of vehicle tires 54 (not shown).

Figure 6:
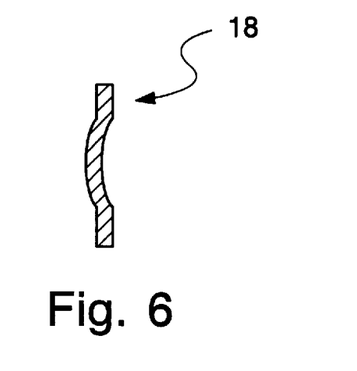
FIG. 6 is a cross-section of line 6—6 of FIG. 5.
Figure 7:
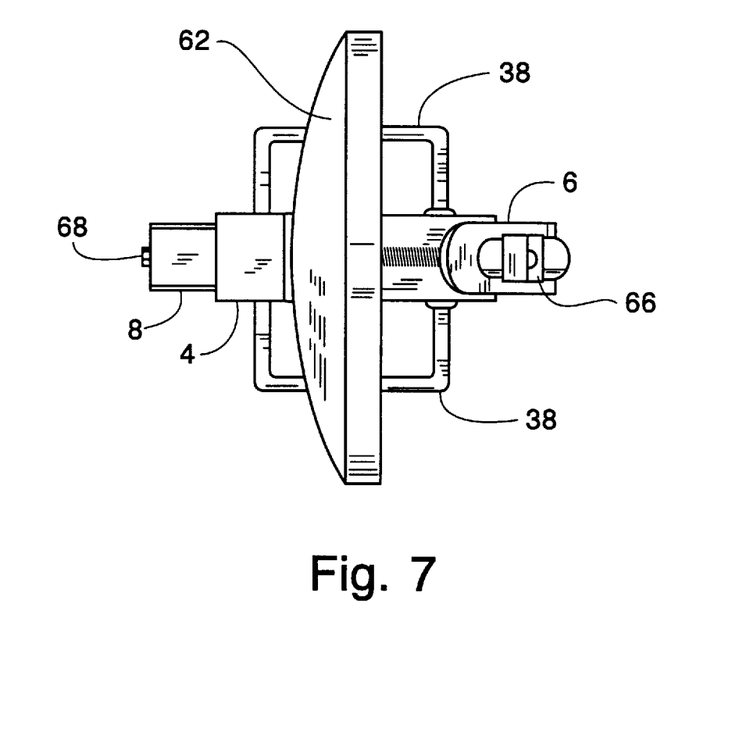
FIG. 7 is a rear elevation view of the vehicle immobilizer illustrated in FIG. 1.

The vehicle immobilizer inner arm 6 is generally comprised of an inner arm first end 24 and an inner arm second end 26. Preferably, the inner arm second end 26 has an arcuate geometric shape to permit the inner arm 6 second end 26 to fit around an inflated tire and to facilitate installation. This configuration is illustrated in FIG. 6. The inner arm first end 24 is pivotally interconnected to the base 8 to permit the inner arm 6 to rotate inwardly and outwardly from the outer arm 4. This rotation eases the installation and removal of the vehicle immobilizer 2 from the vehicle wheel assembly 72, and permits the inner arm second end 26 to be driven against the wheel inner surface 48 as force is applied to the inner arm first end 24.

As further identified in FIG. 1 and FIG. 2, the inner arm second end 26 has an interconnected stopping member 66 positioned to extend outwardly from the inner arm outer surface 30. The stopping member 66 is generally "U"-shaped to provide engagement to a vehicle brake backing plate 56 or vehicle tie rods 58, although a "V"-shape or other similar configuration could be used.

The base 8 is generally comprised of a rectangular shaped enclosure which is rigidly interconnected on one end to the first end of the outer arm 4 and pivotally interconnected to the inner arm first end 24 on the other end. The base 8 further comprises an enclosed securement means which permits the vehicle immobilizer 2 to be removably secured to the vehicle wheel assembly 72. More specifically, the base securement means includes a wrench entry aperture 68 which permits a custom installation tool such as a wrench 74 to be inserted into the base 8 to engage a threaded bolt 40.

To tighten the vehicle immobilizer 2 to the vehicle wheel assembly 72, the threaded bolt 40 is rotated with the wrench 74, which drives the threaded bolt 40 into the inner arm first end 24. This force drives the inner arm first end 24 away from the base 8 in a direction substantially opposite from the outer arm 4, thus creating a rotational movement of the outer arm 4 about the tire stop 14 which is engaged against the vehicle tire 54. Simultaneously, as the inner arm first end 24 is driven outwardly from the outer arm first end 16, the inner arm second end 26 rotates inwardly towards the vehicle wheel assembly 72 and becomes engaged between the vehicle brake backing plate 56 and the wheel inner surface 48. Simultaneously, the engagement dome 10 is driven against the vehicle wheel exterior surface 50 to frictionally engage the vehicle wheel exterior surface 50.

In a preferred embodiment of the present invention a locking device is provided which prevents entry of any type of tool into the wrench entry aperture 68 and thus tampering (not shown). This may be a sliding plate which is opened with a fitted key and which obstructs the wrench entry aperture 68 when the sliding plate is in a closed position.

Figures 3, 4:
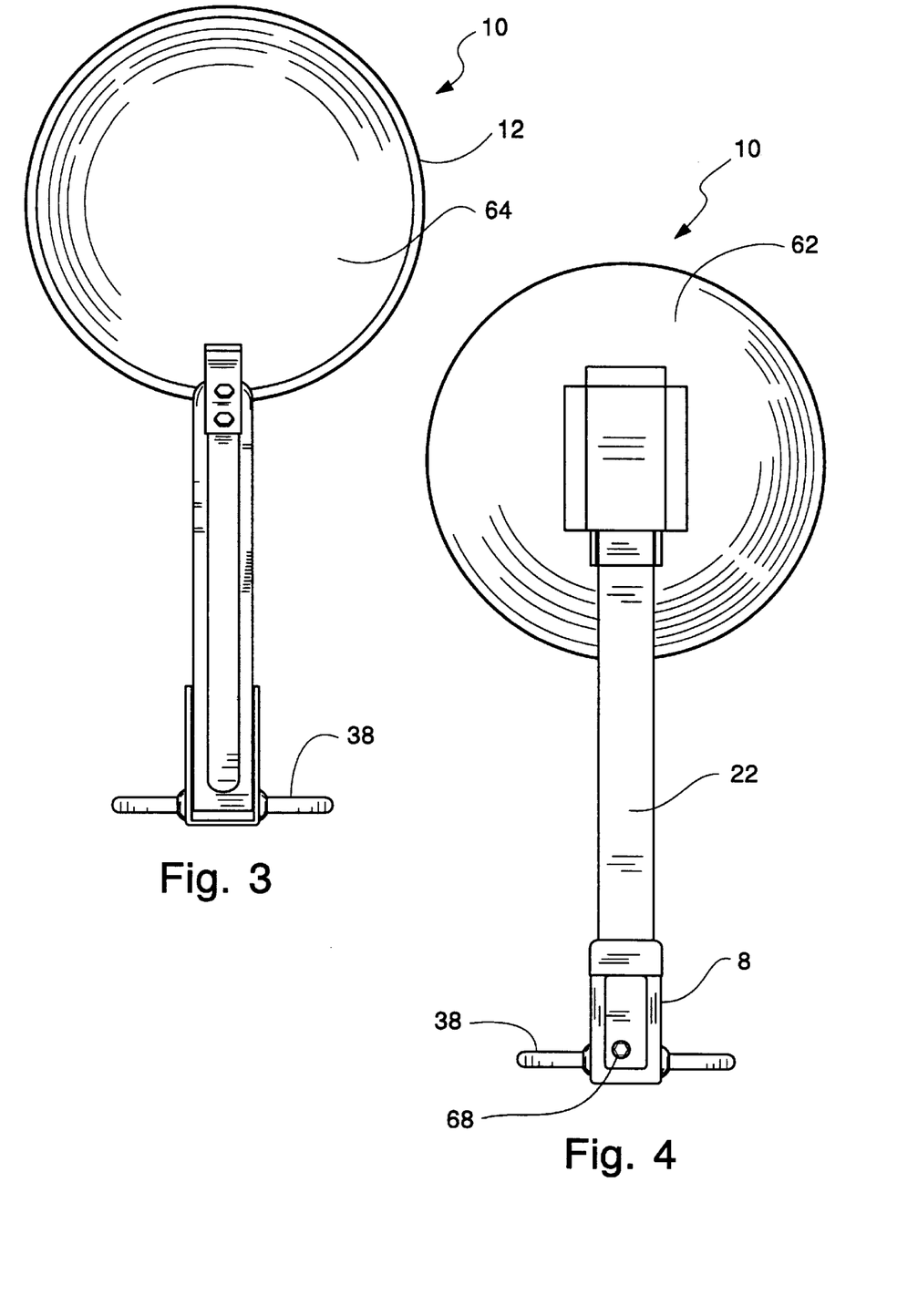
FIG. 3 is a right elevation view of the vehicle immobilizer device illustrated in FIG. 1.
FIG. 4 is a left elevation view of the vehicle immobilizer device illustrated in FIG. 1.

Referring now to FIGS. 3 and 4, the wheel engagement dome 10 is seen from both a left elevation view and a right elevation view. Preferably, the engagement dome 10 is pivotally interconnected to the second end of the outer arm 4 to permit the engagement dome 10 to be adapted to a variety of wheel assemblies 72 and hubcap configurations. More preferably, the engagement dome 10 has a substantially concave concentric shape which permits a portion of a vehicle hubcap 52 or wheel assembly 72 to extend into the vehicle engagement dome 10. This concentric shape inhibits any damage to the hubcap 52 or wheel outer surface 50 by only engaging the wheel outer surface 50 or hubcap 52 at the vehicle engagement dome leading perimeter edge 12. More preferably, the engagement dome leading perimeter edge 12 is covered with a non-metallic material to inhibit scratching the vehicle wheel assembly 72. This material may be comprised of an elastomer, plastic, rubber, felt, cork or other similar non-metallic material known in the art.

Figure 8:
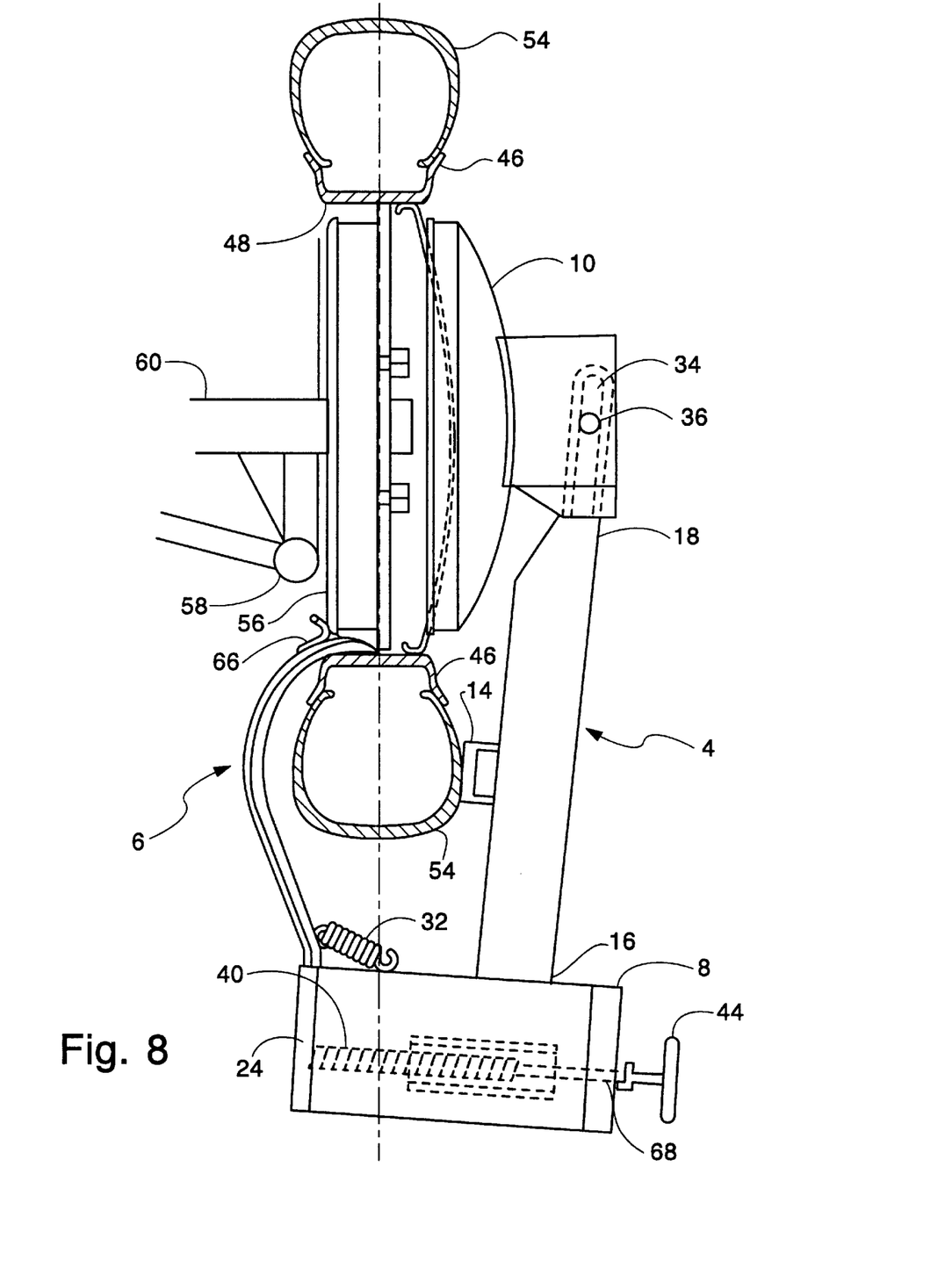
FIG. 8 a cross-sectional upper plan view of the vehicle immobilizer of FIG. 1 attached to a vehicle wheel assembly.

Referring now to FIG. 8, the outer arm 4 preferably comprises a length adjustment mechanism for modifying the total length of the outer arm 4 to fit different sizes of wheel assemblies 72. This length adjustment mechanism may be accomplished by means of an outer arm slot 34 which receives an outer arm pin 36. Alternatively, an outer sleeve assembly which slides over an inner sleeve assembly may be used. This adjustment device allows the vehicle immobilizer 2 to be adapted for use for a number of different wheel assemblies with different lengths between the exterior tread surface of the tire to the center portion of the wheel.

Figure 5:
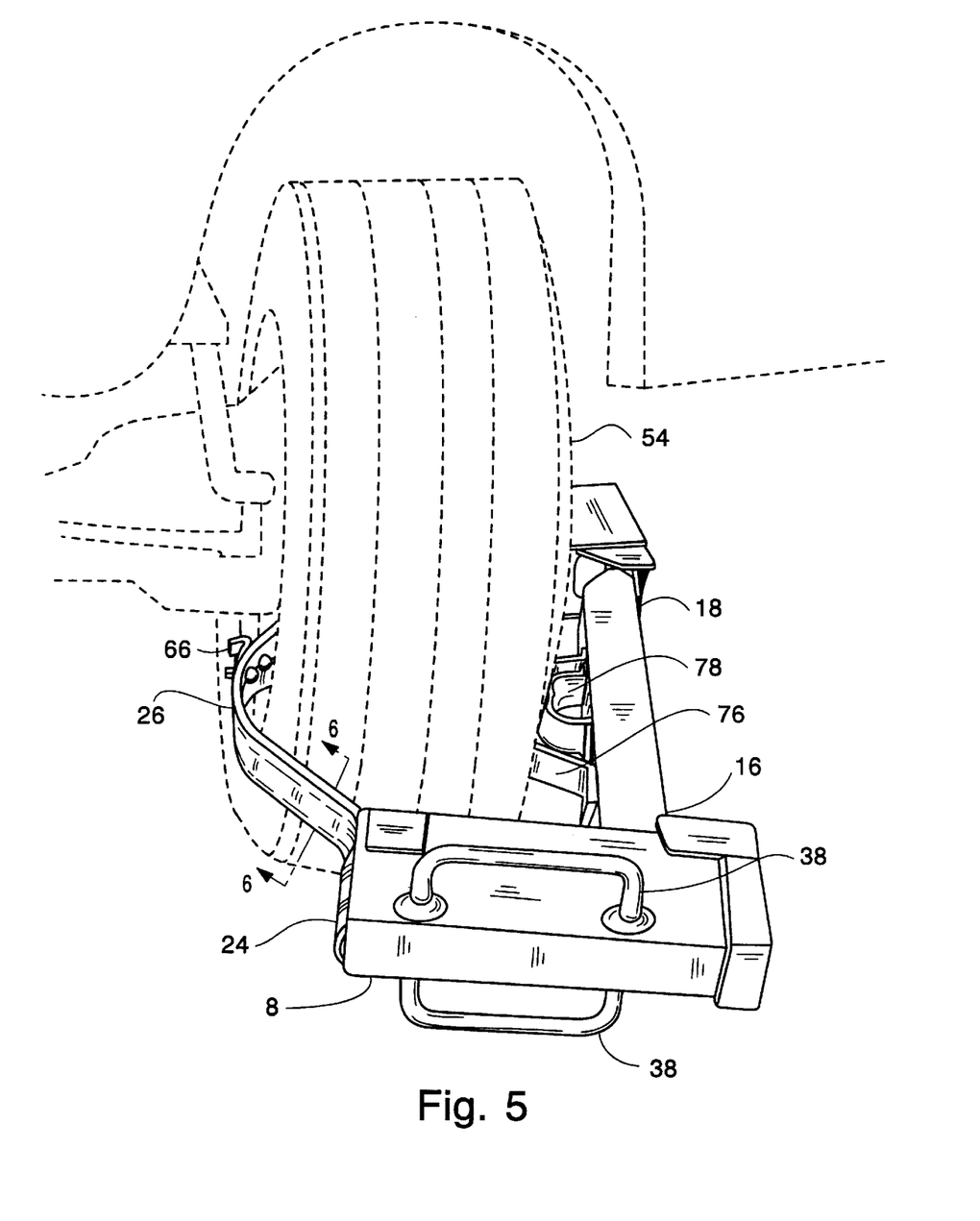
FIG. 5 is a front perspective view of the vehicle immobilizer device illustrated in FIG. 1 installed on a vehicle wheel assembly.

Referring now to FIG. 5, the vehicle immobilizer 2 is shown interconnected to a vehicle wheel assembly 72 to substantially inhibit movement of the vehicle. As illustrated, the outer arm 4 extends substantially parallel to the exterior portion of the vehicle wheel assembly 72 while the inner arm 6 extends around the interior portion of the vehicle wheel assembly 72 near the vehicle axle 60. A stand 38 is provided on both the upper surface and lower surface of the base 8 which allows the vehicle immobilizer 2 to be used on either a right side or left side of any given vehicle. In an alternative embodiment only one stand 38 is interconnected to the base 8 which can be rotated or is capable of being temporarily turned 180 degrees to extend from the end of the base 8 (not shown). In this embodiment the stand 38 can again be utilized to allow the vehicle immobilizer 2 to be installed on either the left or right side of the vehicle. In this configuration the stand 38 is temporarily interconnected to the base 8 with bolts, screws or other removable means commonly known in the art to allow the stand 38 to be quickly removed, rotated, and reconnected to the base 8. Thus, the vehicle immobilizer 2 is versatile for use on either the front, back, left, or right vehicle wheel assemblies 72 or variety of conventional domestic vehicles.

In actual use, a method is provided for attaching the vehicle immobilizer 2 to a vehicle wheel assembly by first positioning an inner arm second end 26 of the vehicle immobilizer 2 on an interior side of the wheel assembly 72. Next, the wheel engagement dome 10 is positioned opposite the exterior side of the wheel assembly, the wheel engagement dome 10 being interconnected to the outer arm second end 18.

A force is then applied against the inner arm first end 24, wherein the inner arm first end 24 and the outer arm 4 are driven apart and the wheel engagement dome 10 engages a wheel or hubcap of the vehicle. Simultaneously, the inner arm second end 24 engages an inner surface of the wheel rim 48 while simultaneously engaging a brake mechanism or a vehicle tie rod with a stopping member 66 which is interconnected to the inner arm second end 26. Finally, an exterior surface of the tire 54 interconnected to the wheel assembly 72 is engaged with a tire stop 14 which is interconnected to the outer arm 4, wherein the vehicle immobilizer 10 is in contact with the wheel assembly at four distinct locations, thus substantially preventing the unauthorized removal of the vehicle immobilizer 2 from the wheel assembly 72.

To assist in the installation of the vehicle immobilizer, a spring 32 or other type of biasing means is preferably interconnected on one end to the base 8 and the other end to the inner arm 6. The spring 32 holds the inner arm second end 26 inwardly towards the outer arm 4 until installation, at which time the inner arm second end 26 is pulled outward to permit the vehicle immobilizer to fit around a vehicle wheel assembly 72. The spring 32 is thus beneficial in that it pulls the inner arm second end 26 inwardly to engage the wheel inner surface 48.

Figure 9:
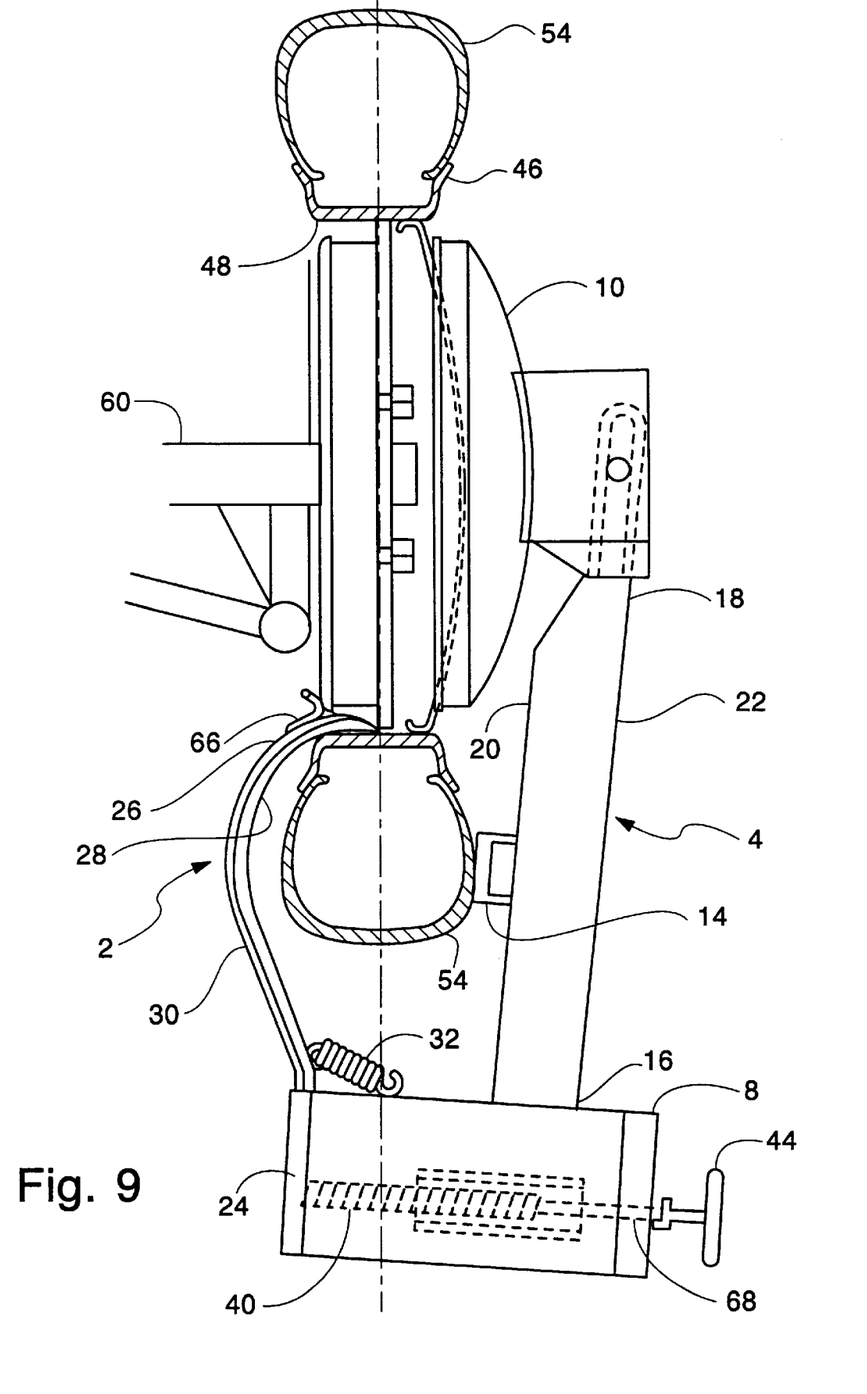
FIG. 9 is a cross-sectional upper plan view of the vehicle immobilizer of FIG. 1 attached to a vehicle wheel assembly.
Figure 10:
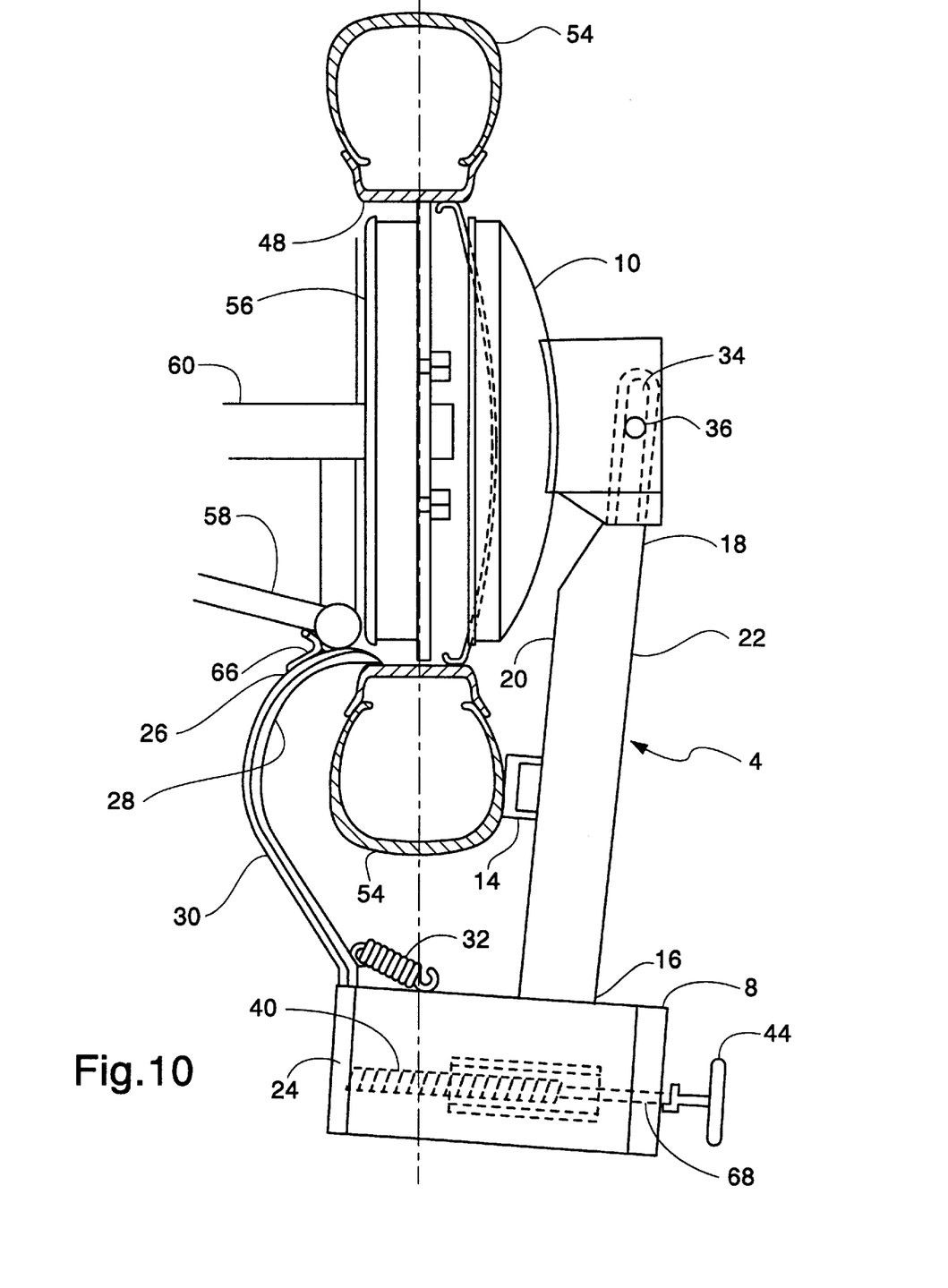
FIG. 10 is a cross-sectional upper plan view of the vehicle immobilizer of in FIG. 1 in contact with an alternative vehicle wheel assembly.

Referring now to FIG. 8, a cross-sectional plan view of the vehicle immobilizer 2 interconnected to a vehicle wheel assembly 72 is shown. As illustrated in FIGS. 8, 9 and 10, the vehicle immobilizer 2 is operatively engaged to the vehicle wheel assembly 72 in at least four distinct locations. These include the vehicle immobilizer wheel engagement dome 10, which is engaged at a first point of contact against the vehicle wheel exterior surface 50. Additionally, the tire stop 14, which is preferably interconnected to an outer arm inner surface 20, is in contact with the vehicle tire 54. Additionally, the vehicle immobilizer inner arm second end 26 is frictionally engaged against the vehicle wheel inner surface 48. Finally, the stopping member 66, which is interconnected proximate to the inner arm second end 26 is engaged against the brake backing plate 56 or vehicle tie rod 58.

During installation, as the threaded bolt 40 is driven against the inner arm first end 24, the stopping member 66 is driven against the brake backing plate 56 or the tie rod 58 (FIG. 10) which forces the inner arm second end 26 to drive deeper between the wheel inner surface 48 and the brake backing plate 56. This prevents the inner arm from being pried loose from the vehicle wheel assembly 72 even if the tire 54 is deflated.

As identified in FIGS. 9 and 10, the inner arm second end 26 and stopping member 66 may work in combination with a variety of wheel assemblies for both older and newer vehicles. For example, in FIG. 8, the stopping member 66 is pressed against a vehicle brake backing plate 56. Likewise, in FIG. 9, the stopping member 66 is driven against a disk brake but not any portion of the brake backing plate 56. Likewise, in FIG. 10, the stopping member 66 is in contact with a vehicle tie rod 58, and thus not engaged to the brake assembly 70 whatsoever.

However, in each of the examples illustrated in FIGS. 8–10, the stopping member 66 is in operable contact with either the brake backing plate 56, a brake assembly 70 and/or the tie rod 58, while the inner arm second end 26 is engaged against the vehicle wheel inner surface 48. This configuration substantially prevents the inner arm from being rotated or pried away from the vehicle wheel assembly, especially since the tire stop 14 is engaged against the vehicle tire 54, thus driving the wheel engagement dome 10 against the wheel as the vehicle immobilizer 2 is secured to the wheel assembly 72.

For purposes of illustration, the following components as identified in FIGS. 1–10 are provided herein for reference:

| Component Number | Component |
|---|---|
| 2 | Vehicle immobilizer |
| 4 | Outer arm |
| 6 | Inner arm |
| 8 | Base |
| 10 | Wheel engagement dome |
| 12 | Engagement dome leading perimeter edge |
| 14 | Tire stop |
| 16 | Outer arm first end |
| 18 | Outer arm second end |
| 20 | Outer arm inner surface |
| 22 | Outer arm outer surface |
| 24 | Inner arm first end |
| 26 | Inner arm second end |
| 28 | Inner arm inner surface |
| 30 | Inner arm outer surface |
| 32 | Spring |
| 34 | Outer arm slot |
| 36 | Outer arm pin |
| 38 | Stand |
| 40 | Threaded bolt |
| 41 | Threaded aperture |
| 44 | Tightening tool |
| 46 | Wheel |
| 48 | Wheel inner surface |
| 50 | Wheel exterior surface |
| 52 | Hubcap |
| 54 | Tire |
| 56 | Brake backing plate |
| 58 | Tie rod |
| 60 | Vehicle axle |
| 62 | Engagement dome outer surface |
| 64 | Engagement dome inner surface |
| 66 | Stopping member |
| 68 | Wrench aperture |
| 70 | Brake assembly |
| 72 | Wheel assembly |
| 74 | Wrench |
| 76 | Tire stop outer member |
| 78 | Tire stop inner member |

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A four point vehicle immobilizing apparatus adapted for use in combination with a vehicle wheel assembly having a wheel, a brake mechanism and a tire interconnected to said wheel, comprising:

an outer arm having a first end, a second end and an adjustment means for modifying a total length of said outer arm;

a tire stop interconnected to said outer arm and extending inwardly for frictional engagement to an outer surface of said tire;

a wheel engagement dome interconnected to said second end of said outer arm, said wheel engagement dome having a leading perimeter edge adapted for engaging said wheel assembly;

an inner arm having a first end, a second end, an inner surface and an outer surface, said second end operatively shaped to fit entirely between said brake mechanism and a wheel of said wheel assembly, wherein said second end of said inner arm is positioned on a back side of said wheel and frictionally engages an inner portion of said wheel when said immobilizing apparatus is attached to said wheel assembly;

a rigid stopping member interconnected to said outer surface of said inner arm proximate to said second end and extending outwardly from said inner arm, said rigid stopping member adapted to engage at least a portion of said brake mechanism during use;

a base portion rigidly interconnected to said first end of said outer arm and pivotally interconnected to said first end of said inner arm, wherein said inner arm can pivot inwardly and outwardly from said outer arm; and a securing means interconnected to said base portion to provide a force to said first end of said inner arm and drive said first end of said inner arm outwardly from said base in a direction opposite said outer arm, wherein said dome assembly frictionally engages said wheel assembly, said tire stop engages said tire, said stopping member engages said brake mechanism and/ or a tie-rod assembly and said second end of said inner arm engages an inner surface of said wheel.

2. The apparatus of claim 1, wherein said second end of said inner arm has a substantially arcuate cross-sectional shape.

3. The apparatus of claim 1, wherein said adjustment means comprises a slot to operably engage a pin interconnected to said circular shaped dome.

4. The apparatus of claim 1, wherein said adjustment means comprises an outer sleeve interconnected to said circular shaped dome and sized to slidably receive said outer arm.

5. The apparatus of claim 1, wherein said leading perimeter edge of said wheel engagement dome comprises a non-metallic material to inhibit scratching of said vehicle wheel assembly during use of said vehicle immobilizing apparatus.

6. The apparatus of claim 1, said securing means comprising a threaded aperture interconnected to said base portion and operably sized to receive a threaded bolt having a first end adapted to fit a tightening tool and a second end in contact with said first end of said inner arm.

7. The apparatus of claim 1, wherein said wheel engagement dome is pivotally interconnected to said second end of said outer arm.

8. The apparatus of claim 1, wherein said wheel engagement dome is substantially circular in shape.

9. The apparatus of claim 1, further comprising a support stand interconnected to an upper surface and a lower surface of said base portion, wherein said base portion is prevented from contacting the ground and said apparatus may be interchangeably interconnected to either a left side of said vehicle or a right side of said vehicle.

10. The apparatus of claim 1, further comprising a biasing means interconnected on a first end to said base and on a second end to said inner arm, wherein said inner arm is biased towards said outer arm.

11. The apparatus of claim 1, wherein said wheel engagement dome has a recessed interior for receiving a portion of an outwardly extending wheel assembly while said leading perimeter edge of said engagement dome remains engaged to a perimeter of said wheel assembly.

12. The apparatus of claim 1, wherein said inner arm and said outer arm are comprised of a metallic material resistant to cutting, bending or deformation.

13. The apparatus of claim 1, wherein said securing means is substantially enclosed by said base portion to inhibit tampering.

14. The apparatus of claim 1, wherein said stopping member is substantially U-shaped to engage a vehicle tie-rod assembly positioned proximate to said wheel assembly.

15. A method for attaching an apparatus adapted for use in combination with a wheel assembly of a vehicle for temporary immobilization, comprising the steps of:

a) positioning a second end of an inner arm of said apparatus on an interior side of said wheel assembly;

b) positioning a wheel engagement dome opposite an exterior side of said wheel assembly, said wheel engagement dome interconnected to a second end of an outer arm;

c) applying a force against a first end of said inner arm, wherein said first end of said inner arm is driven outwardly from said base in a direction opposite said outer arm and said engagement dome engages a wheel or hubcap of said vehicle;

d) engaging an inner surface of said wheel rim with said second end of said inner arm, said second end of said inner arm shaped to fit entirely between a brake mechanism of said vehicle and said vehicle wheel assembly, wherein said inner arm frictionally engages an inner portion of said wheel;

e) engaging a brake mechanism or a vehicle tie rod with a hook stop interconnected to an outer surface of said inner arm and proximate to said second end of said inner arm; and f) engaging an exterior surface of a tire interconnected to said wheel assembly with a tire stop interconnected to said outer arm, wherein said apparatus is in contact with said wheel assembly at four distinct locations, thus substantially preventing the unauthorized removal of said apparatus from said wheel assembly.

16. The method of claim 15, wherein the step of applying a force comprises rotating a bolt which is in contact on a first end with said first end of said inner arm.

17. The method of claim 15, further comprising the step of pulling said second end of said inner arm away from said outer arm when said inner arm is biased in a position proximate to said outer arm to facilitate positioning said second end of said inner arm around said wheel assembly.

18. A vehicle immobilizer device adapted for removable interconnection to a vehicle wheel assembly at four distinct points of contact, comprising:

a) an outer arm having a first end and a second end, said second end pivotally interconnected to a substantially circular dome assembly and adapted for engagement to a vehicle wheel, said outer arm further comprising adjustment means for modifying the total length of said outer arm;

b) a tire stop interconnected to said outer arm and extending inwardly to engage a tire interconnected to said vehicle wheel assembly;

c) an inner arm having a first end, a second end, an interior surface and an exterior surface, said second end having a geometric configuration adapted for complete penetration between a brake mechanism of said wheel assembly and an inner wheel rim of said wheel assembly to frictionally engage an inner surface of said wheel rim;

d) a substantially U-shaped stopping member interconnected to said exterior surface of said inner arm proximate to said second end and adapted to engage said brake mechanism and/or a vehicle tire-rod assembly during use;

e) a base portion rigidly interconnected to a first end of said outer arm and pivotally interconnected to a first end of said inner arm; and f) a securing means interconnected to said base portion for providing a force to said first end of said inner arm to drive said first end of said inner arm in a direction substantially opposite said outer arm, wherein said vehicle immobilizer engages said wheel assembly at four distinct locations.

19. The vehicle immobilizer of claim 18, wherein said securing means comprises a threaded bolt operably engaged to a threaded aperture interconnected to said base and in contact on one end with said first end of said inner arm.

20. The vehicle immobilizer of claim 18, wherein said inner arm second end has an arcuate cross-sectional shape to facilitate frictional engagement to said inner surface of said wheel rim.

* * * * *

UNITED STATES PATENT AND TRADEMARK OFFICE
CERTIFICATE OF CORRECTION

PATENT NO. : 5,865,048
DATED : Feb. 2, 1999
INVENTOR(S) : Beavers et al.

It is certified that error appears in the above-identified patent and that said Letters Patent is hereby corrected as shown below:

Assignee should read Miti Manufacturing Co., Inc., Grand Junction, Colo. <u>NOT</u> Beavers et al.

Signed and Sealed this

Eleventh Day of April, 2000

Attest:

Q. TODD DICKINSON

Attesting Officer

Director of Patents and Trademarks